(12) United States Patent
Erickson

(10) Patent No.: US 9,073,499 B1
(45) Date of Patent: Jul. 7, 2015

(54) MODULAR VEHICLE-MOUNTABLE POD

(71) Applicant: William Carl Erickson, Portland, OR (US)

(72) Inventor: William Carl Erickson, Portland, OR (US)

( * ) Notice: Subject to any disclaimer, the term of this patent is extended or adjusted under 35 U.S.C. 154(b) by 0 days.

(21) Appl. No.: 14/015,467

(22) Filed: Aug. 30, 2013

Related U.S. Application Data

(60) Provisional application No. 61/695,891, filed on Aug. 31, 2012.

(51) Int. Cl.
*B60R 11/06* (2006.01)

(52) U.S. Cl.
CPC ....................... *B60R 11/06* (2013.01)

(58) Field of Classification Search
CPC .............. B60R 9/00; B60R 9/02; B60R 9/04; B60R 9/042; B60R 9/0423; B60R 9/055; B60R 9/06; B60R 9/065; B60R 11/00; B60R 11/06
USPC .......................... 296/37.1, 37.6, 24.45, 24.44; 224/402–405
See application file for complete search history.

(56) References Cited

U.S. PATENT DOCUMENTS

| | | | |
|---|---|---|---|
| 1,991,900 A | | 2/1935 | Larsen |
| 2,504,222 A | * | 4/1950 | Otto ............................ 296/24.45 |
| 3,058,607 A | | 10/1962 | Kiley |
| 4,705,315 A | * | 11/1987 | Cherry .......................... 296/37.1 |
| 4,714,305 A | | 12/1987 | Service |
| 4,789,195 A | * | 12/1988 | Fletcher ........................ 296/37.6 |
| 4,830,421 A | | 5/1989 | Hawelka et al. |
| 4,844,305 A | | 7/1989 | McKneely |
| 5,102,180 A | | 4/1992 | Finley |
| 5,498,048 A | * | 3/1996 | Shelby, Jr. .................. 296/24.45 |
| 5,590,925 A | * | 1/1997 | Banks, Sr. ................... 296/24.45 |
| 5,593,201 A | | 1/1997 | Bateman |
| 5,785,372 A | * | 7/1998 | Glatzmeier et al. ........ 296/24.45 |
| 5,845,952 A | * | 12/1998 | Albertini et al. ............. 296/37.6 |
| 5,897,154 A | * | 4/1999 | Albertini et al. ............. 296/37.6 |
| 6,142,549 A | * | 11/2000 | Clare et al. .................... 296/37.6 |
| 6,176,540 B1 | | 1/2001 | Whittaker |
| 6,189,945 B1 | * | 2/2001 | Rockett ........................ 296/37.6 |
| 6,270,138 B1 | | 8/2001 | Laskowski et al. |
| 6,386,610 B1 | * | 5/2002 | Butzke ........................ 296/24.45 |
| 6,443,544 B1 | | 9/2002 | Wolf et al. |
| 7,270,360 B2 | * | 9/2007 | Frasure et al. ............... 296/37.6 |
| 8,162,367 B2 | * | 4/2012 | Kuklok ............................ 296/3 |
| 8,162,371 B2 | * | 4/2012 | Heuvelman ................... 296/37.6 |
| 8,376,437 B2 | * | 2/2013 | Edens ......................... 296/26.05 |
| 8,757,458 B2 | | 6/2014 | Nebel |
| 2006/0226671 A1 | * | 10/2006 | Thole et al. ................. 296/24.45 |
| 2008/0231066 A1 | * | 9/2008 | Harrell .......................... 296/37.6 |
| 2009/0001741 A1 | * | 1/2009 | Heuvelman ................. 296/24.32 |
| 2009/0140021 A1 | | 6/2009 | Richter et al. |
| 2010/0301721 A1 | * | 12/2010 | Nebel ............................ 312/326 |
| 2011/0037286 A1 | * | 2/2011 | Nebel ............................ 296/37.6 |
| 2012/0217214 A1 | | 8/2012 | Thomsen |
| 2013/0088134 A1 | | 4/2013 | Varner et al. |

* cited by examiner

*Primary Examiner* — Gregory Blankenship
(74) *Attorney, Agent, or Firm* — Law Office of Karen Dana Oster, LLC

(57) ABSTRACT

A modular vehicle-mountable pod for mounting in a vehicle, the pod including an upper section, a center section, and a lower section. The center section has at least one door on each side of the vehicle. At least one sliding storage board is positioned within and in sliding relationship to the center section. Each sliding storage board is a mounting surface board with at least one bin thereon. The at least one sliding storage board is at least partially slideable through the at least one door on both sides of the vehicle such that the at least one bin is accessible.

20 Claims, 13 Drawing Sheets

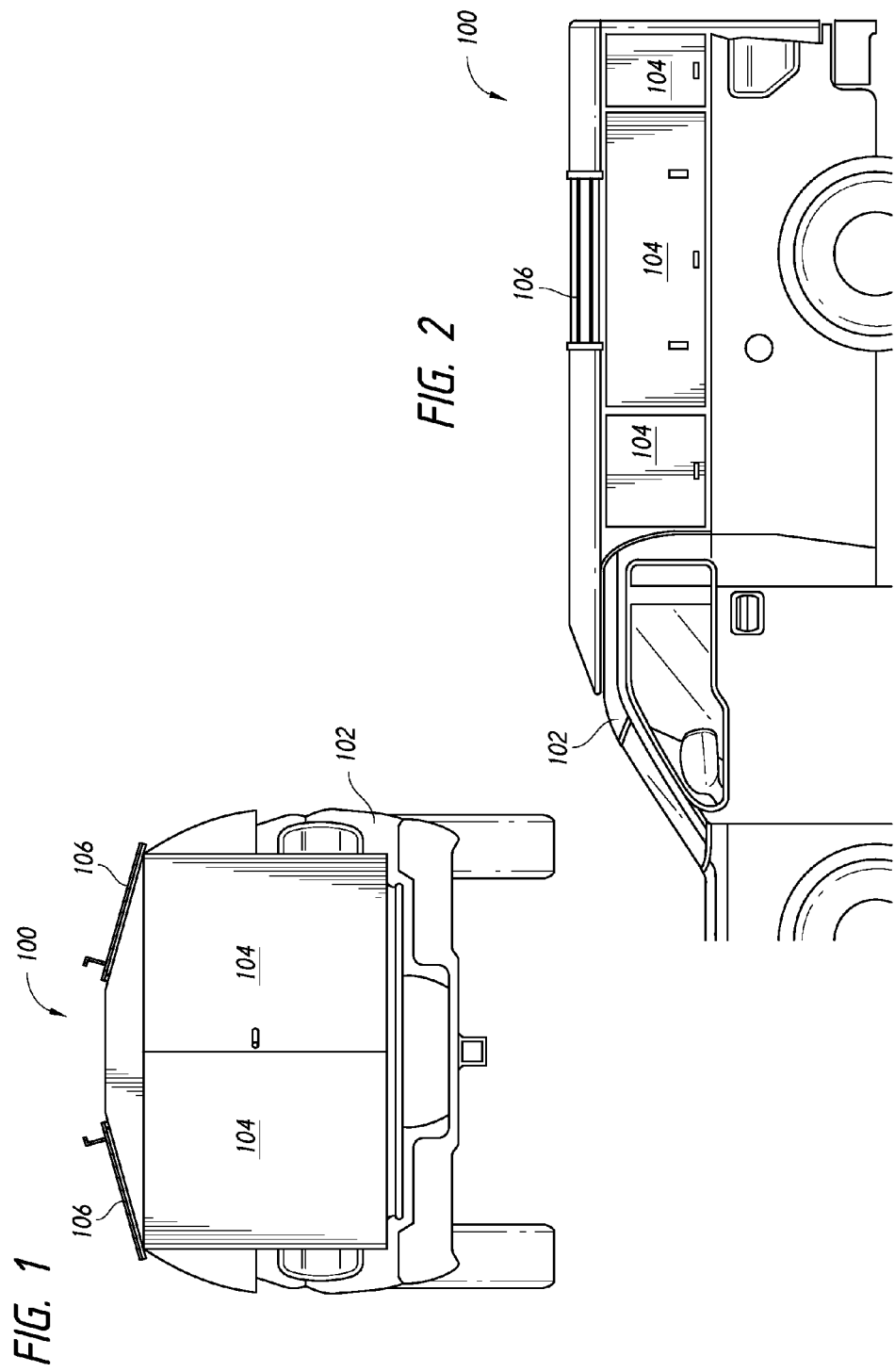

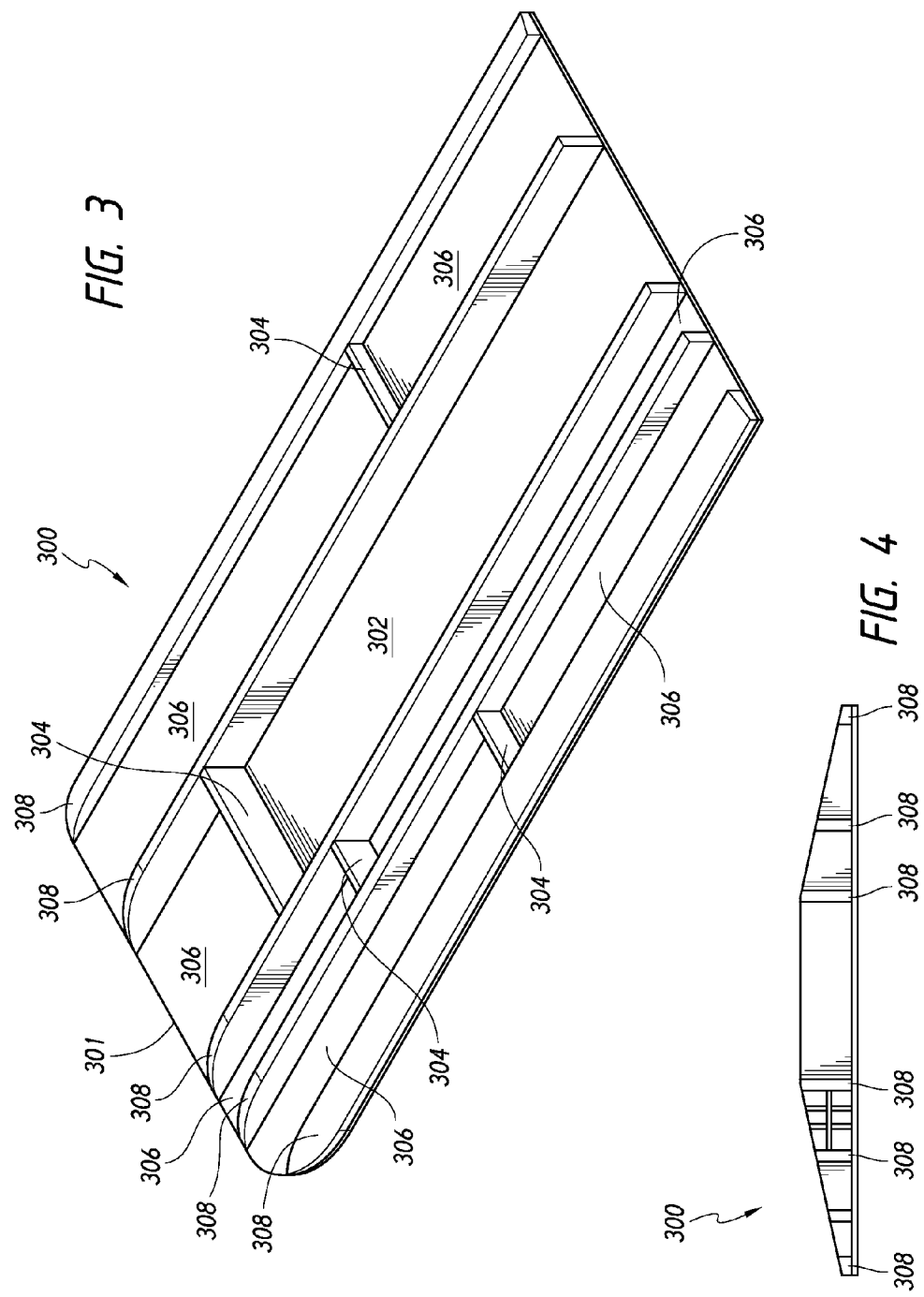

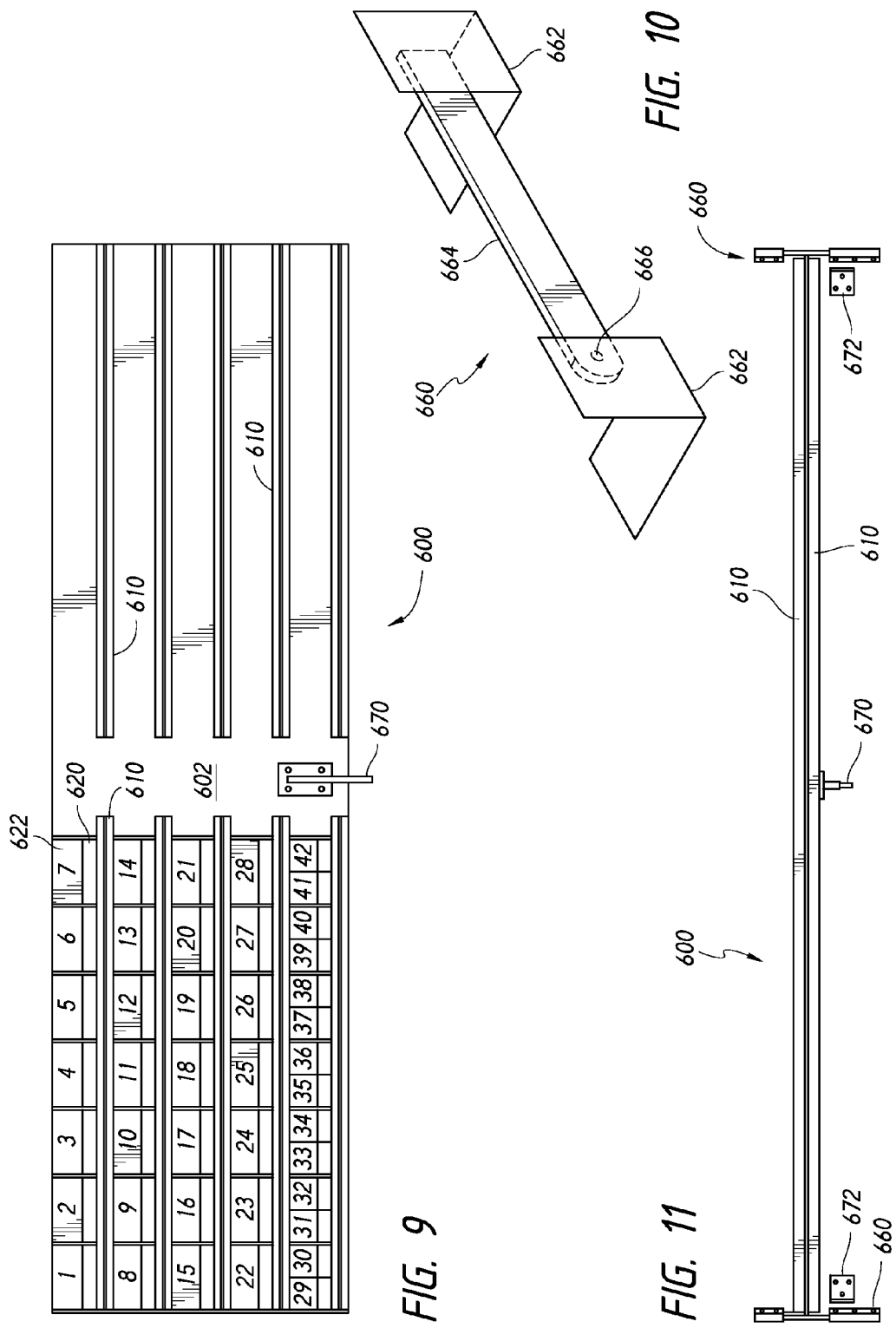

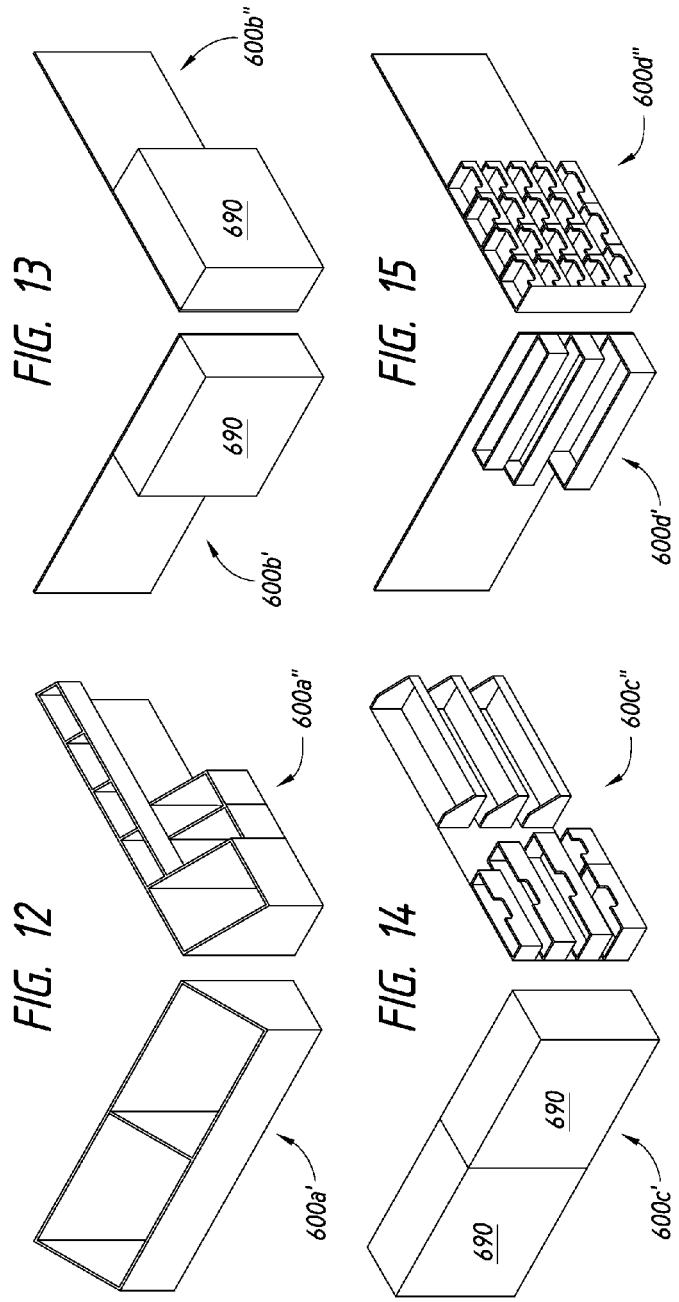

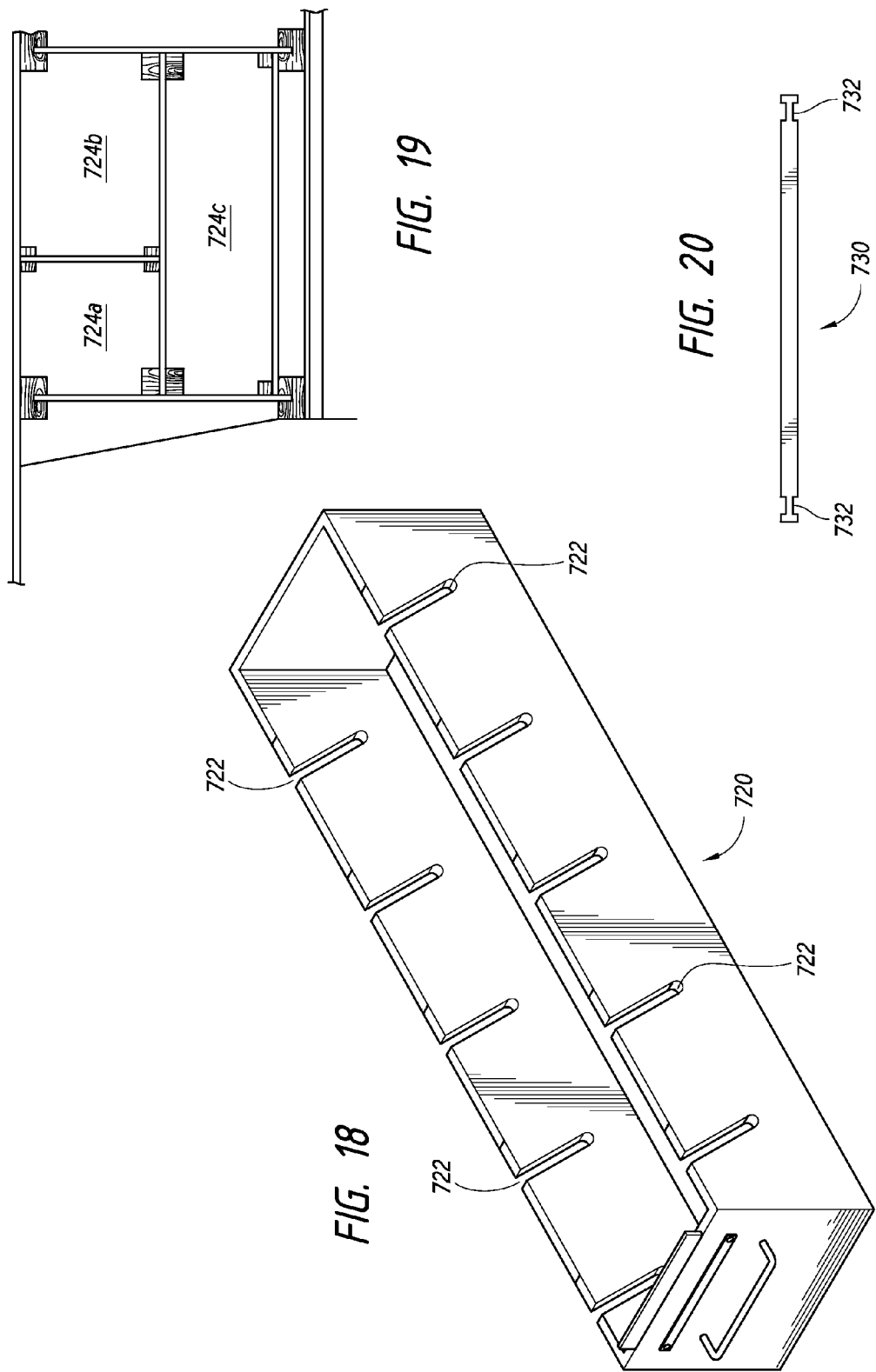

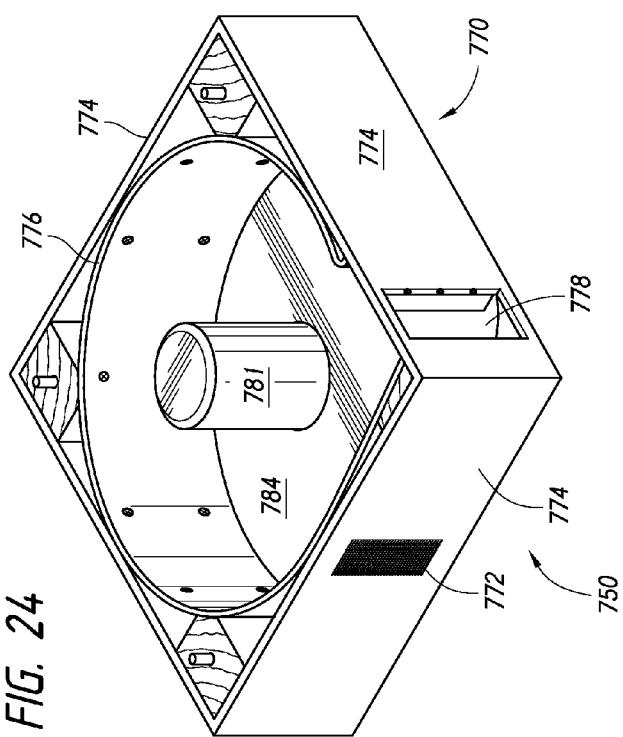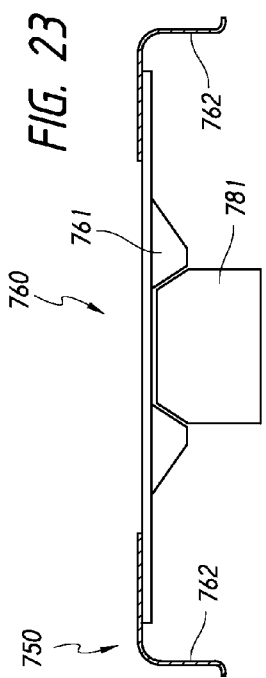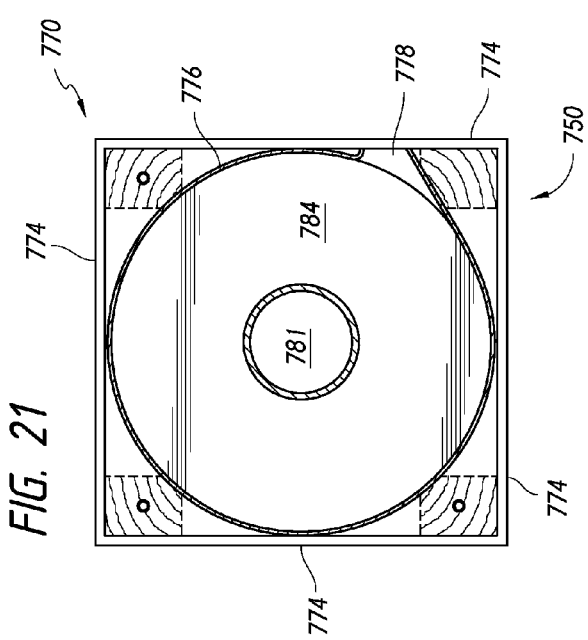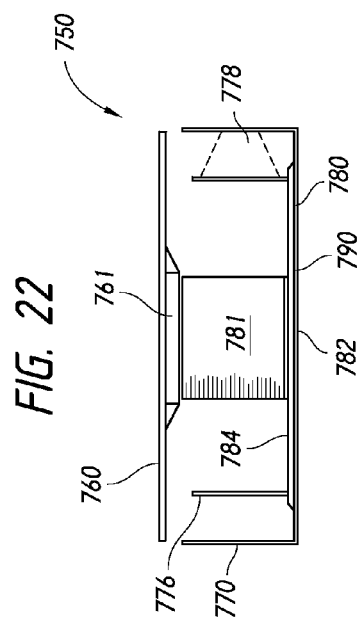

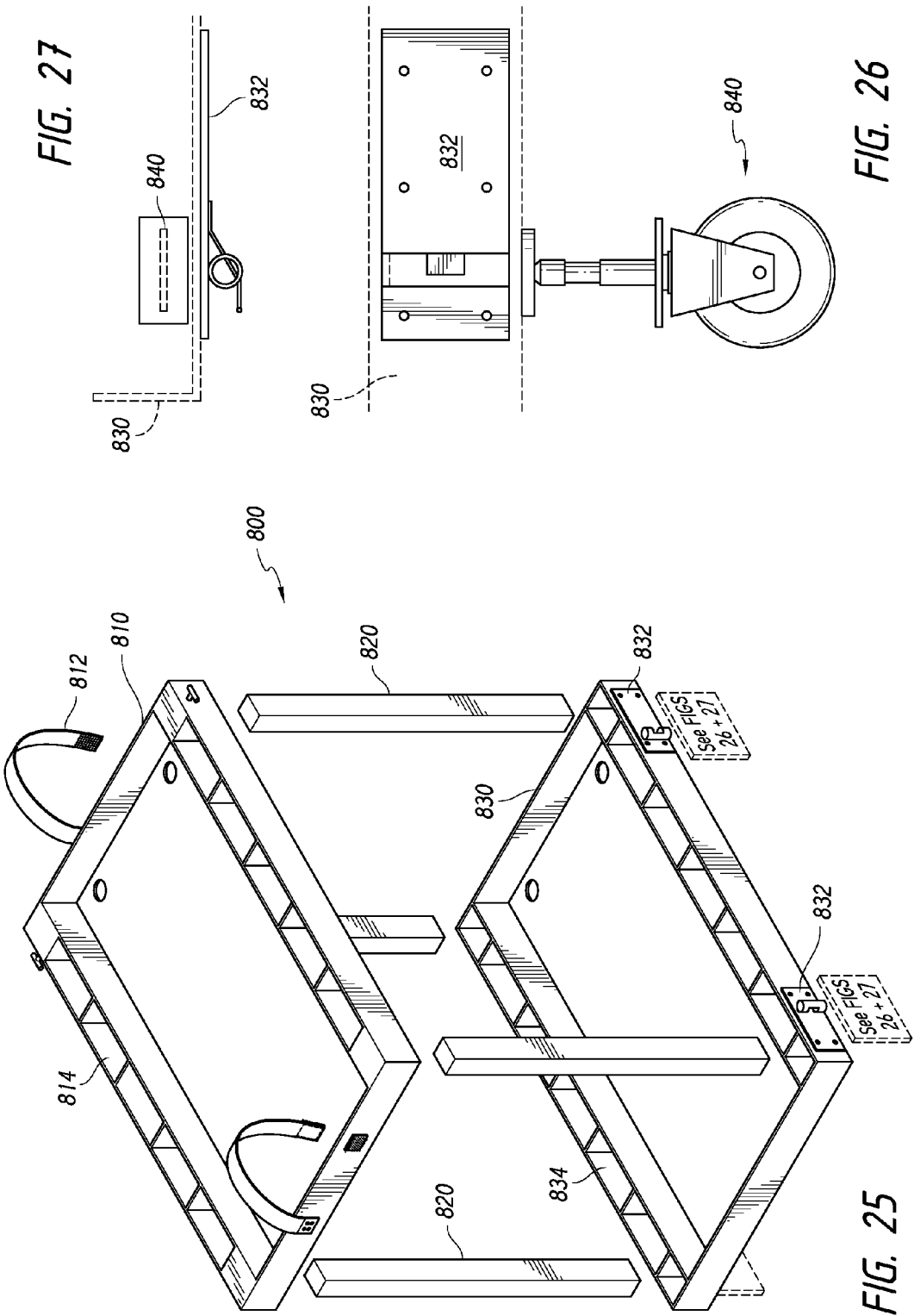

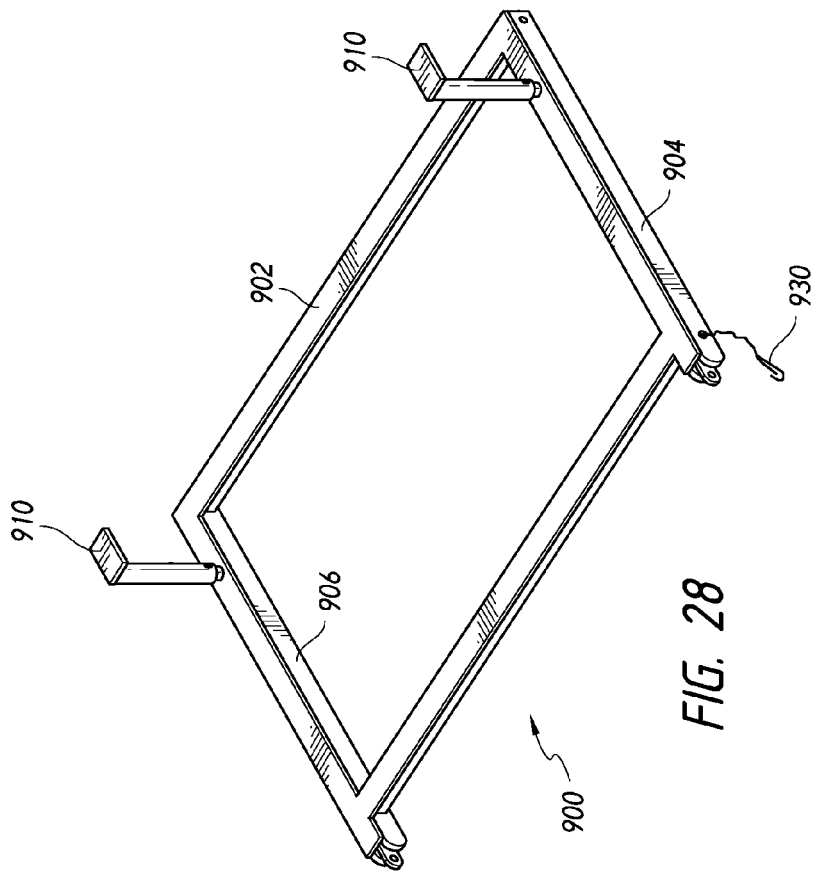
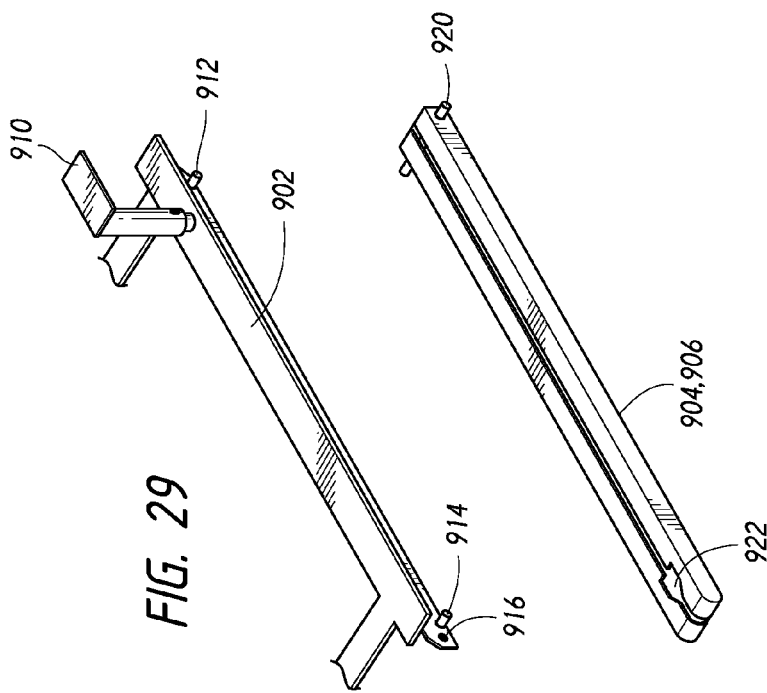

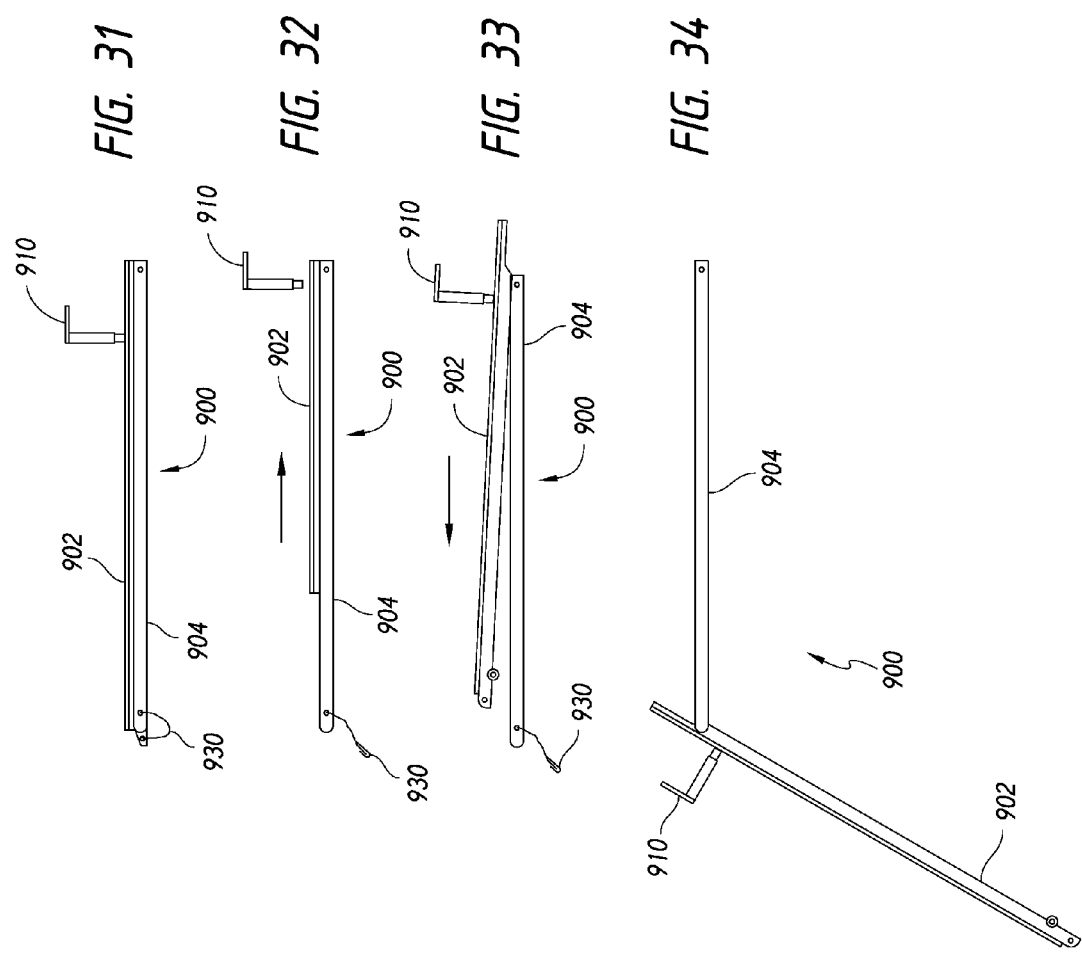

MODULAR VEHICLE-MOUNTABLE POD

The present application is an application claiming the benefit of U.S. Provisional Patent Application Ser. No. 61/695,891, filed Aug. 31, 2012. The present application is based on and claims priority from this application, the disclosure of which is hereby expressly incorporated herein by reference in its entirety.

BACKGROUND OF THE INVENTION

Disclosed herein is a pod and, more particularly, a modular vehicle-mountable pod.

At least some existing vans, SPRINTERS™, and pickups with canopies currently serve the electrical industry. These vehicles may not be capable of entering and parking within a normal parking garage structure that meets with National Building Codes regulating the construction of parking garages.

Removal and replacement of ladders from known vans, SPRINTERS™, and pickups require both time and effort on the part of the service technician.

Having to transport the same tools and materials to and from the shop (or to and from the technician's home) increases fuel costs associated with the vans, SPRINTERS™, and pickups.

BRIEF SUMMARY OF THE INVENTION

Described herein is a modular vehicle-mountable pod for mounting in a vehicle having a front, a back, and two sides. The pod includes an upper section, a center section, and a lower section. The upper section is above the center section, and the center section is above the lower section. The center section has at least one door on each side of the vehicle. At least one sliding storage board is positioned within and in sliding relationship to the center section. Each sliding storage board is a mounting surface board with at least one bin thereon. The at least one sliding storage board is at least partially slideable through the at least one door on both sides of the vehicle such that the at least one bin is accessible.

The pod has a maximum height of 6 feet, 10 inches when it is unloaded.

The upper section further includes a plurality of elongated compartments parallel to the sides of the vehicle. The upper section further includes a ladder storage system.

The center section is divided into subsections. Subsections include a spooled or roll wire subsection; a cable subsection; an electrical subsection; a storage board subsection; a miscellaneous storage subsection; and an electrical tools, chargers, and test equipment subsection.

The lower section includes a rolling bed. The lower section includes a plurality of sections selected from a personal tools section; a rolling bed section; a storage drawers section; and a jack storage section.

The pod further includes at least one system selected from the group of features consisting of: a 120 volt electrical system; a material storage area; an on-board computer; on-board security; a wire de-spooler; a de-spooler for cable; and a break-down rolling cart.

The pod is easily removable from the vehicle.

BRIEF DESCRIPTION OF THE SEVERAL VIEWS OF THE DRAWINGS

FIG. 1 is a rear view of an exemplary pod and a service truck.

FIG. 2 is a side view of the exemplary pod and a service truck shown in FIG. 1.

FIG. 3 is a perspective view of the uppermost section of the pod's three sections.

FIG. 4 is a rear view of the uppermost section of the pod's three sections shown in FIG. 3.

FIG. 9 is a front or direct view of one side of one storage board, half of which has both angles and bins and half of which has only angles.

FIG. 10 is a perspective view a gate locatable at each end of the storage board.

FIG. 11 is a top view of the storage board having gates at each end.

FIGS. 12-16 are perspective views of two sides of five storage boards.

FIG. 18 is a perspective view of a pulling frame of a wire de-spooler.

FIG. 19 is a side view of a front driver's side pod section having a #12 wire roll de-spooler, a #10 wire roll de-spooler, and an extra roll storing drawer.

FIG. 20 is a plan view of a pulling axle of a wire de-spooler.

FIG. 21 is a plan view of a cable de-spooler with the top section removed.

FIG. 22 is a side view of the cable de-spooler with the top section.

FIG. 23 is an enlarged side view of the upper portion cable de-spooler showing the relationship of the top section and the top of the spindle.

FIG. 24 is a perspective view of a cable de-spooler with the top section removed.

FIG. 25 is an expanded, perspective view of a break-down cart.

FIGS. 26 and 27 are detail views of a quick attach/detach wheel of the break-down cart.

FIG. 28 is a perspective view of a ladder rack including a main portion and two sub-portions.

FIG. 29 is a perspective view of part of the main portion of the ladder rack.

FIG. 30 is a perspective view of one of the of the sub-portions of the ladder rack.

FIG. 31 is a side view of the ladder rack including a main portion and two sub-portions in a traveling position.

FIG. 32 is a side view of the ladder rack in which the main portion has been slid back relative to the two sub-portions and lifted.

FIG. 33 is a side view of the ladder rack in which the main portion has been slid out and rotated down relative to the two sub-portions.

FIG. 34 is a side view of the ladder rack in which the main portion has been rotated relative to the two sub-portions.

Figure 5:
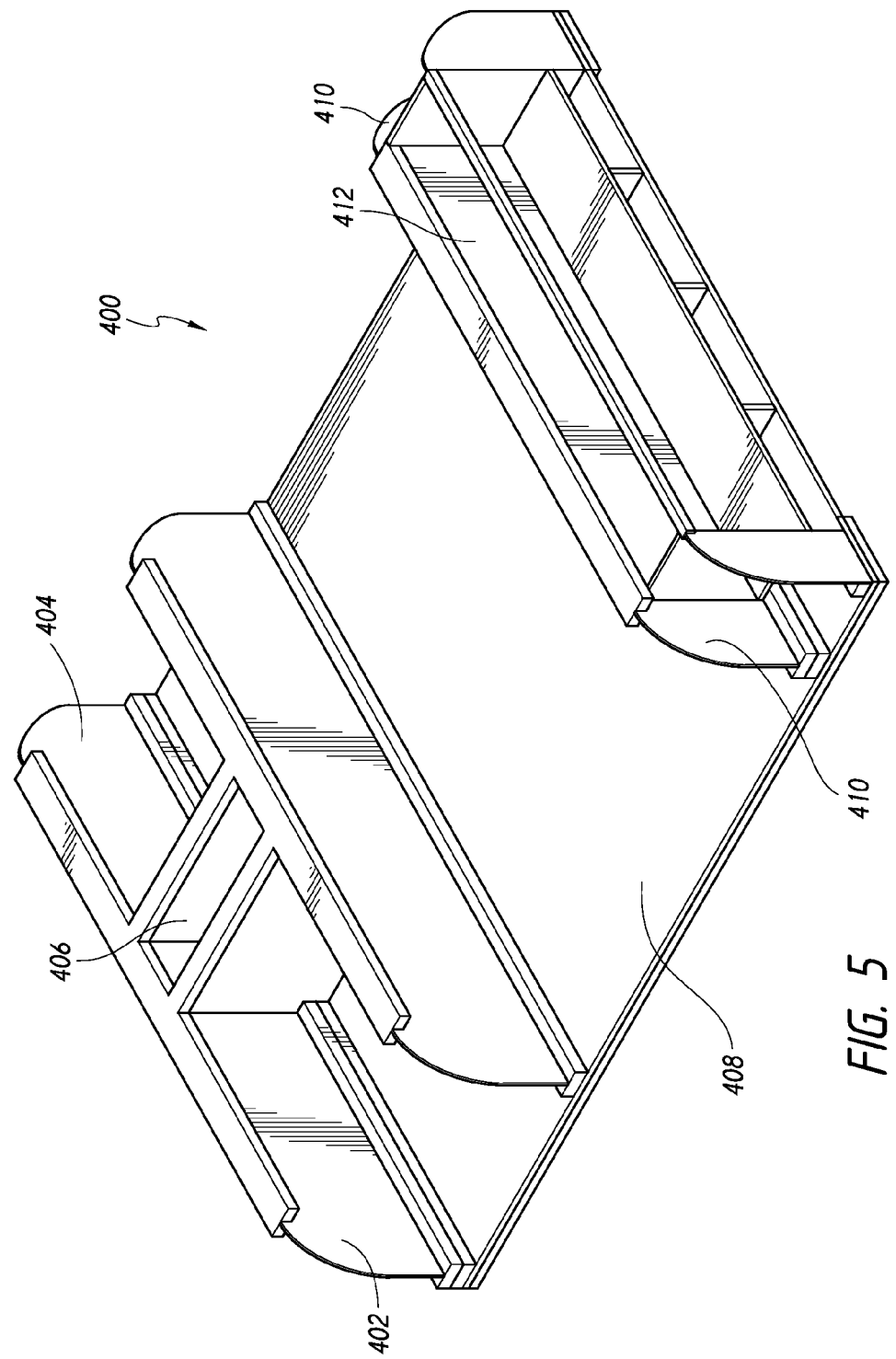
FIG. 5 is a perspective view of the center section of the pod's three sections.

The drawing figures are hereby incorporated in and constitute a part of this specification.

DETAILED DESCRIPTION OF THE INVENTION

Exemplary pods may be better understood with reference to the drawings. The same reference numbers will be used throughout the drawings and description in this document to refer to the same or like parts Pod Overview The exemplary electrician's model pod 100 is intended to replace existing vans, SPRINTERS™, and pickups with canopies that are currently serving the electrical industry. This electrician's model pod 100 incorporates a number of new and modified features compared to the usual electrical service van. Adaptation of this basic unit will result in highly efficient models for the plumbing, finish carpentry, surveying, appliance repair, painting, and roofing industry.

Height: The exemplary pod 100 is limited to a maximum height of 6 feet, 10 inches when it is unloaded. The innovative ladder rack system allows ladders to be lowered to the side during slow transport. This height feature complies with National Building Codes regulating the construction of parking garages. This makes the electrician's model pod 100 the only full sized service vehicle capable of entering and parking within a normal parking garage structure. This enhances access to adjacent structures for men, material, and tools.

Ladder Storage System: This unit is specifically designed to allow ground access to the innovative ladder storage system. This system carries and secures the ladders to the vehicle. It is easily lowered into a position on the sides of the exemplary pod 100 for easy removal and replacement of ladders. This saves both time and effort on the part of the service technician. A detailed description of the ladder storage system is set forth herein in connection with FIGS. 28-34.

120 Volt Electrical System: The exemplary pod 100 provides a 200 amp hour battery with charger and inverter to supply four electrical outlets located in the rear tool section of the pod 100. These outlets provide power for continuous battery charging for battery operated tools normally used in the industry without an external 120 volt supply. The 200 amp hour battery is recharged either by external 120 volt source or directly from the trucks alternator during transit. The combined inverter and battery system is capable of providing direct 120 volt power for short intervals for lighting, drill motors, pipe threading equipment, and other power tools used on an intermittent basis. In effect, this system provides the technician with a limited emergency generator system wherever he is working.

Sliding Storage Boards: These movable and removable storage systems provide adequate space for most of the components. Details show how bins and boxes are attached to house materials on site and during transit. Each board has approximately 18 inches in vertical storage height and is about 5½ feet long. Since both sides of the storage board are used, the total storage surface area of five boards is about 82 square feet or slightly less than the surface area of three standard sheets of plywood. To put this into context, if a user mounted 4 inch wide×4 inch high×5 inch deep bins 620 on the entire surface area, the user could install approximately 740 individual storage compartments. Storage boards 600 are discussed in relation to FIGS. 7 and 8.

Material Storage Area: The exemplary pod 100 has an area specifically designed for material storage. In most normal vans (e.g. SPRINTERS™, etc.), carrying materials in available space also immediately restricts access to on-board materials. The exemplary pod 100 can easily accommodate standard 8 foot strip fixtures, service panels, etc. It is possible to load a complete rough in package for a mid-sized home into the cargo area and still carry on normal service calls. This saves time and money.

On Board Computer And Security: The sky is the limit for these systems. No matter how well you build an on-site material container, someone can and will find a way to break into a standard storage structure. The exemplary pod 100 skips by the idea of security through strength of construction and moves directly to on-site security via detection and alarm. Powered by the inaccessible emergency on-board power source, basic security is achieved by what is best described as a car alarm system that can be enhanced all the way to an ONSTAR®-style system, which will actually notify police about the ongoing event and location of the attempted theft or vandalism. A laptop computer is located in the cab and ranges in function from a simple computer to a WIFI®-connected voice to text inventory and billing system. It can add and subtract materials as used or returned as indicated by the spoken voice. It can track travel and on-site service time. It can even tabulate and print out final billings on site. With a WIFI® connection it can tabulate and reorder materials used from the exemplary pod 100 during the course of a day, week, or any chosen interval, and then order directly from the wholesale house for next day pick up. A downloadable application can be used to allow ones smart phone to locate any of the potentially hundreds of different items stored in the exemplary pod 100 quickly. This is discussed in more detail in relation to FIG. 17.

Easy Removal Of The Pod: Electrically powered removable jacks allow the exemplary pod 100 to be off loaded from the truck for independent use. The exemplary pod 100 can be left on-site while the truck is used to transport larger loads to the site. This allows technicians to access materials and continue work if the driver is called off-site. In projects with a longer duration, the exemplary pod 100 can serve as an on-site gang box and material storage area. Allowing the truck to operate without having to transport the same tools and materials to and from the shop, or to and from the technician's home thereby reduces fuel costs.

Fuel Economy Via Ford ECOBOOST® Technology: Combining the flexibility of the exemplary pod 100 with new fuel economy of Ford ECOBOOST® engines will allow the exemplary pod 100 to operate at substantially lower fuel costs.

Resale Of Pickup Vs. Van Or SPRINTER™: One of the largest benefits of the exemplary pod 100 is that when its associated truck is retired and replaced, resale demand will be substantially higher than that of a used van or a used SPRINTER™.

On Board Specialty Equipment: Certain specific pieces of equipment have been designed for the exemplary pod 100. These include: a wire de-spooler for individual wires on rolls and a de-spooler for cable assemblies such as non-metallic (NM) and metal-clad (MC) cable. A break-down rolling cart (shown in detail in FIGS. 25-27), which is stored so as not to interfere with access to tools and material, is included. Where needed, this cart allows assembly of tools and materials together at one time, and then rolling into the worksite. It saves time and the technician's physical energy.

FIGS. 1 and 2

FIGS. 1 and 2 show an exemplary pod 100. FIG. 1 shows a rear view of a pod 100 and a service truck 102. (The front view of the pod 100 and service truck are not shown because when mounted on a pickup, the front view shows only the front of the uppermost portion or section 300 of the pod 100.) FIG. 2 shows a driver's side view of the pod 100 and the service truck 102. The driver's side image of the exemplary pod is identical to the passenger's side.

The exemplary pod 100 is meant to conform to the contour of a Ford pickup truck (e.g. a standard bed Ford F-150™ or F-350™ series in this case). If used on another type of truck, the pod 100 would be adjusted to be compatible with the dimensions of the other type of truck.

Sealing and locking doors 104 are found on each side and on the back of the pod 100. These locations increase access to the interior storage of the pod 100 when compared to traditional vans or SPRINTERS™. A user does not have to crawl into or climb steps and/or ladders up to the pod 100 in order to access the tools and material.

Ladder racks 106 may be mounted anywhere along the length of the pod 100. They should, however, be located in a position to accommodate the minimum ladder storage capacity. An exemplary pod 100 can carry one each of: a 10 foot ladder (20 foot extension ladder), a 10 foot step ladder, or an 8 foot step ladder and a 6 foot step ladder. Of course additional ladders could be carried in the cargo storage area.

One of the best features of the exemplary pod 100 is that it can be easily and quickly removed from the truck. This frees the truck for more economical use as a commuter vehicle. Free of the pod 100, the truck 102 can carry anything a user might consider hauling in a pick-up truck. This means versatility where a user gets nearly two vehicles for the price of one.

FIGS. 3 and 4

FIGS. 3 and 4 show the uppermost of the pod's three sections, an upper section 300. The upper section 300 is designed to provide dry storage for an assortment of long materials. The upper section 300 is shown with the front edge 301 contoured to match the cab of the truck design. It is shown with dimensions of approximately 65 inches wide, 12 feet long, and 6 inches high.

Conduit is the main material stored in this area. The center and largest part 302 of this pod section has an internal height of 5 inches. This allows for storage of any type of 4 inch conduit or smaller trade size conduit (10 foot standard length). Many sizes of conduit can be "telescoped" for storage. ½ inch electric metallic tubing (EMT) fits inside ¾ inch EMT, and ¾ inch EMT fits inside 1 inch EMT. It is easy to see that 200 feet of each of these three conduit types of EMT would use only a small fraction of the available space. There is plenty of room for an added variety of conduit to meet the service technician's needs or preferences. Because it is easily viewed, if not computer tracked, the material area is easily inventoried. Other materials such as "wire-mold" can be carried as stock or when needed for a specific job.

The upper section 300 is clearly longer than ten feet and crosspieces 304 are installed, as indicated in the figures, to control the length of various compartments 306 and center part 302. The center part 302 is shown with a width determined by the ribs or stringers 308. The crosspieces 304 are shown as blockings for lateral support that limits the length of the storage space 302. Materials such as ground rods and benders are provided storage here. For these items, the crosspieces 304 are placed to ensure that access is always easy from the rear of the pod 100.

In addition to creating separate compartments, long ribs or stringers 308 of this section 300 provide a strong skeleton to support the weather-proof skin and form the shape of the pod 100. The ladder racks are secured directly to the long ribs 308 giving them strength and stability.

FIG. 5

Shown in FIG. 5, a center section 400 of the three pod sections is the primary material storage area in the pod 100. (FIG. 5 is the framework, but it would be covered as shown in FIGS. 1 and 2.) The center section 400 is shown as being divided into subsections including a spooled or roll wire subsection 402, a cable subsection 404, an electrical subsection 406, a storage board subsection 408, miscellaneous storage subsections 410, and a tool storage subsection 412.

Spooled or Roll Wire Subsection 402: Located in the pod 100, directly behind the driver's seat, subsection 402 stores spooled wire and provides two innovative wire de-spoolers for number 12 and number 10 wire. Subsection 402 is discussed in relation to additional drawings, such as FIGS. 18-20.

Cable Subsection 404: Located in the pod 100, directly behind the passenger's seat, subsection 404 provides storage for cables such as NM and MC. Two innovative cable de-spoolers are provided as well. Subsection 404 is discussed in relation to additional drawings, such as FIGS. 21-24.

Electrical Subsection 406: Directly behind the cab and between the "Spooled Wire" and "Cable" subsections (402 and 404, respectively) is the subsection 406. This is the power center for the pod 100 and houses a 200 amp-hour battery, inverter, and 120 volt charger. Subsection 406 is discussed in relation to additional drawings, such as FIG. 17.

Storage Board Subsection 408: A subsection 408 is the largest compartment in the center or middle section and is located behind or to the rear of the subsections 402, 404, and 406. Depending on the technician's needs, the subsection 408 can handle five or possibly six storage boards 600. Bins 620 of specific shapes and sizes are mounted to these sliding panels. These bins 620 handle all manner of parts including fittings, boxes, straps, nuts, bolts, and screws. Pipe straps, breakers, lubricants, safety equipment, and whatever else one can imagine will store neatly in this compartment and will be readily available to the technician. Subsection 408 is also discussed in relation to additional drawings, such as FIGS. 7-16.

Miscellaneous Storage Subsections 410: On either side and at the rear of the pod 100 are small storage areas, subsections 410. Each subsection 410 is accessible via a door on the sides of the pod 100. Small in size, they are adequate for storage of any number of odds and ends that always appear in the electrical industry.

Electrical Tools, Chargers, and Test Equipment Subsection (Tool Storage Subsection) 412: The purpose of the subsection 412 is to supply a technician with a constant supply of fully charged battery operated power tools. This list would include drill motors, roto hammers, SAWZALL® tools, and crimping tools. Specific storage areas are provided for multimeters and ammeters, a 2 inch bottle punch set, a holes saw kit (to 4 inches), and a circuit tracing kit. Two, 120 volt, duplex outlets are provided to power and size charger.

FIG. 6

Figure 6:
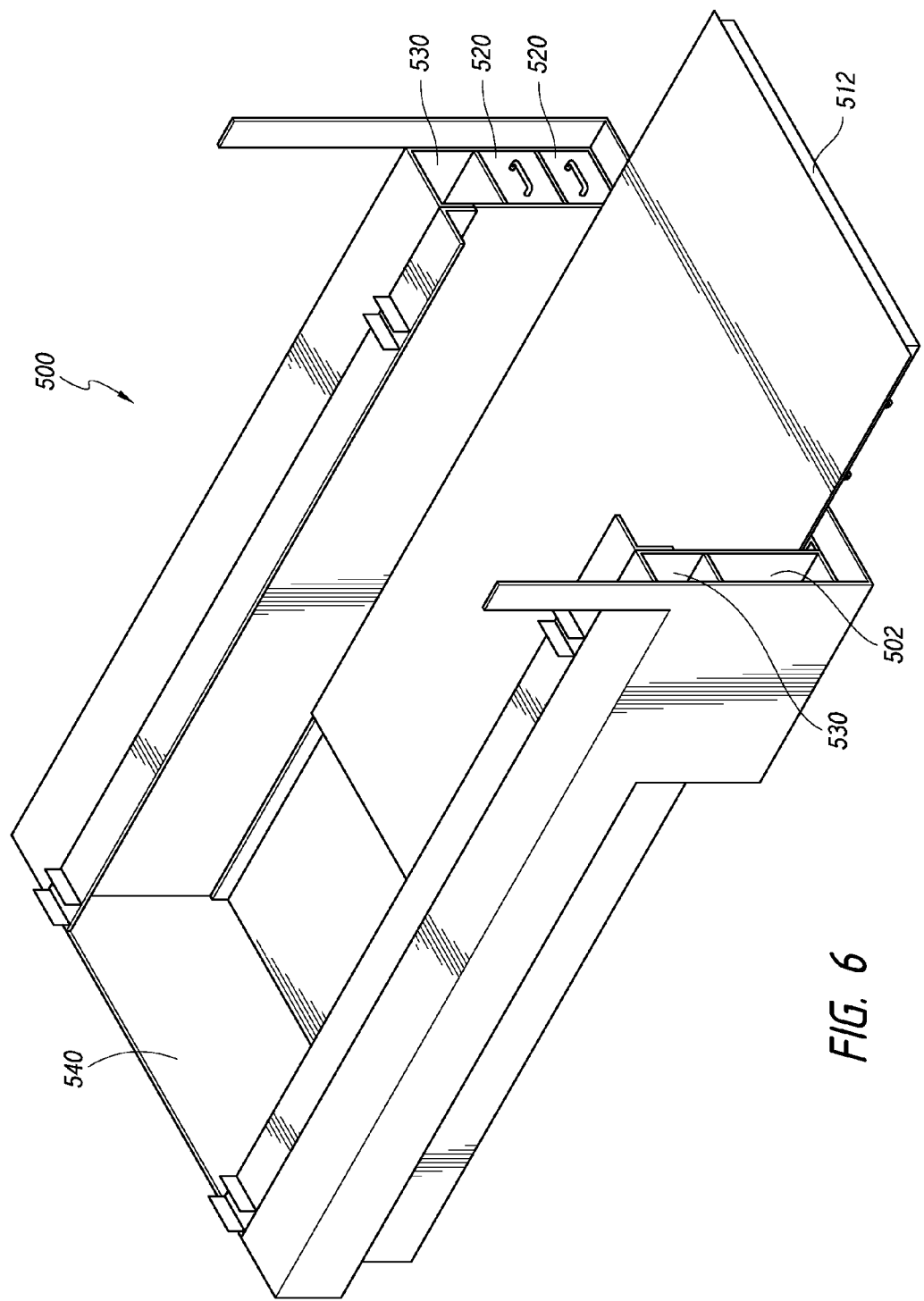
FIG. 6 is a perspective view of the third or lower section of the pod's three sections.

FIG. 6 shows the third or lower section 500 of the pod 100 that provides the base support for the pod unit 100 and provides an additional specific storage area. This lower section 500 is shown as being approximately 5 feet, 5 inches wide and approximately 8 foot, 3 inches long. FIG. 6 shows the lower section 500 of the pod 100 including a personal tools section 502, a rolling bed section 540, a storage drawers section 520, and a jack storage section 530. FIG. 6 also shows flange welds to channel in the center section 400.

Personal Tools 502: Looking into the pod 100 from the rear with the doors open, a medium sized area has been provided for personal tools provided by the technician. The personal tool area 502 is water tight.

Rolling Bed or Drawer Storage 540: The center and by far largest section of the lower portion of the pod 100 is occupied by a "slide out" shelf (sometimes called a slide out bed 512). The bed 512 is 8 feet long, extends outward 5 feet, and can support 300 pounds when fully extended. Though the shelf is 8 feet long, it is specifically located in a cavity 540 that is 8 feet, 4 inches deep. This allows the shelf to slide out, and to be loaded with 8 foot long fixtures (8 foot, 2 inch including cardboard box). The "shelf" 512 is 4 foot wide. In electricians' terms, one can load 36 2 tube by 8 foot strip fixtures onto this shelf or all the components necessary to rough in a 1500 square foot home (including can lights). Though one would want to think it through and load that rough in package carefully, the roll out feature allows the technician to access all his materials without crawling into the unit or using abusive language. Even panel boards may fit into this section 540. This section 540 is not designed to use in handling loads that must be loaded by forklift.

Storage Drawers 520: When looking inward from the back of the unit, two or three deep drawers 520 are provided on the right hand side of the pod's lower unit 500. The storage drawers 520 are 5 inches×6 inches and are provided as storage for items such as (a) bits (including ship augers, uni-bits, drill bit cases, and paddle bits) and (b) wrenches (including strap, large end wrenches, and pipe wrenches).

Jack Storage 530: The jack storage sections 530 are shown as being on either side of and on the outside of the "rolling drawer" compartment 540. The jack storage sections 530 are shown as long rectangular tubes. The jack storage sections 530 assist in strengthening the overall unit and provide a storage place for the removable electric jacks.

FIGS. 7-16

FIGS. 7-16 show a storage board 600 and components associated therewith. As set forth above, subsection 408 can handle five or possibly six storage boards 600. The storage boards 600 are one of the most useful features of the pod 100. An actual board 602 (about 5 feet, 5 inches long and about 18 inches high) serves as a mounting surface. The board's 602 overall strength is enhanced by the addition of aluminum angles 610 (shown as 610a-e) and bins 620.

Figure 7:
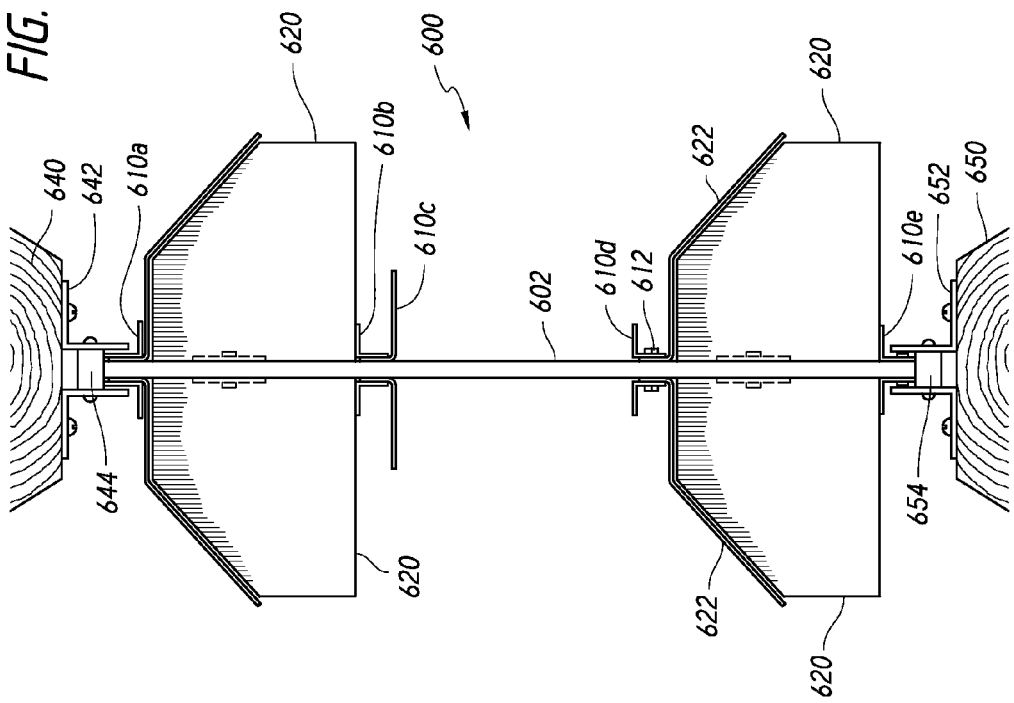
FIG. 7 is a cross-sectional or end view of a storage board with bins mounted thereon.

FIG. 7 is a cross-section or end view of the storage board 600. It shows two rows of bins 620 attached and room for a third row of bins 620. Smaller sized bins 620 increase the number of bins 620 per unit area. Larger bins 620 would be the opposite. One can see that the bins 620 rest on ½ inch×½ inch aluminum angles 610a-610e that are pop riveted (e.g. rivet 612) to the board 602. The bins 620 are attached using a pop rivet 612 combined with a large thin fender washer. The action of attaching the angles 610a-610e and the bins 620 to the board 602 increases the rigidity and strength of the storage board 600 far beyond its stand alone capacity.

As set forth above, bins 620 of specific shapes and sizes are mounted to the sliding panels 600. The bins 620 handle all manner of parts including fittings, boxes, straps, nuts, bolts, and screws. Pipe straps, breakers, lubricants, safety equipment, and whatever else one can imagine will store neatly in this compartment and will be readily available to the technician.

The aluminum angles 610a-610e, while used to give shear support to the bins 620, also secure a molded flexible clear plastic cover 622 to the top of the bins 620. This molded cover 622 serves several purposes. First, if the storage board 600 is slid out of the pod 100 to access materials and it happens to be raining, the contents of the bins 620 remain dry. Second, though light and flexible, the plastic is strong enough to keep material from bouncing out of the bins 620. Finally, due to the cover's 622 clarity, one can see what is stored in the bin 620.

At the top of FIG. 7 is a piece of wood 640 to which added angle 642 and a simple bearing 644 are attached. This bearing(s) 644 allows the storage board 600 to slide in and out effortlessly. Angles 610a-610e are added to the edges of the bins 620 to provide a strong edge on which to slide. Angles 610e also help prevent debris accumulation in the track.

Figure 8:
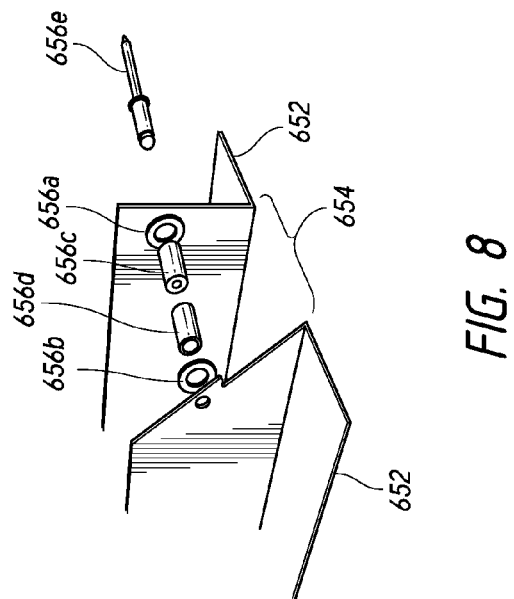
FIG. 8 is an expanded, perspective view of the bottom bearing assembly of FIG. 7.

FIG. 8 shows details of the bottom bearing assembly of FIG. 7. As shown in these figures, the bottom bearing assembly includes a piece of wood 650 to which added angle 652 and a simple bearing 654 are attached. This bearing(s) 654 allows the storage board 600 to slide in and out effortlessly. FIG. 8 shows the simple bearing 654 as including washers 656a and 656b, a spacer/axle 656c, a rotating tube 656d, and a pop rivet 656e. Angles 610a-610e are added to the edges of the bins 620 to provide a strong edge on which to slide. Angles 610e also help prevent debris accumulation in the track.

Depending on the final weight of the board 602, bins 620, angles 610a-610e, and materials stored, the bearings may be omitted.

FIG. 9 is a front or direct view of one side of one storage board 600. Its dimensions are shown 5 feet, 5 inches wide and 18 inches tall. In final construction these dimensions are likely to differ slightly. The left hand or half of the board has the actual bins 620 laid out. The right side or half of the board only shows the aluminum angles 610a-610e attached indicating adequate space for an installation identical to that on the left.

The type of bin 620 to be used in the layout of FIG. 9 is a clear bin and has the dimensions of 3 inches high, 4 inches wide, and 5 inches deep. It is, as shown on the bottom row of bins, available with dividers thereby allowing space for materials that require less by size or number carried. If the area laid out for bins 620 was designated for one-half inch fittings for conduit, one could easily store 40 different fittings (shown as 42 fittings) that should more than adequately cover the diversity of fittings needed for such conduit. This space constitutes one-tenth of all the storage capacity of the storage board's contained in a standard pod arrangement.

The material storage board 60 should have adequate fittings, etc. to install 200 feet of conduit.

FIG. 10 shows a gate 660 located at each end of the storage board 600. When closed, the gate 660 prevents the storage board 600 from sliding. The gate 660 is shown as including two angles 662 and a latch 664 that is attached by a rivet 666 at one end to one of the angles 662. When one side gate 660 is opened, the storage board 600 may slide in that direction, one half its length.

FIG. 11 is a top view of the storage board 600. The center indicates the board 602 (nothing attached). The sections above and below the center indicate the aluminum angles 610 that form the track in which the board 602 slides. At each end is the "end latch" or "gate" 660 (shown in FIG. 10). Also shown attached to the board 602 at its center and just above the track is the "center stop" 670. When the board 602 is slid in either direction, this center stop 670 will run into the "end stop" 672 located near the end of the board. This mechanism 670, 672 prevents the board 602 from sliding out more than one-half its length. The use of bearings 644, 654 (and also restricting the overall travel to half the board's length) prevents the board and its contents from binding when sliding in and out.

The pod 100 carries a standard five storage boards 600 (shown as 600a'-e" in FIGS. 12-16). FIGS. 12-16 each show two sides of a storage board 600 indicated by the use of prime (') and double prime ("). These figures show a type of structure (bin size location and orientation) produced to contain the types of materials listed under each side of the board. Blocks designated as 690 refer to the typical bin layout shown in FIG. 9. FIG. 12 is shown with one side 600a' having miscellaneous flex, MC, NM storage and the other side 600a" having safety equipment storage. FIG. 13 is shown with one side 600b' having tape, T-wrap, and ½ inch fitting storage and the other side 600b" having ¾ inch conduit fittings, mudrings, and blanks storage. FIG. 14 is shown with one side 600c' having termination and 1 inch fitting storage and the other side 600c" having box support and breaker storage. FIG. 15 is shown with one side 600d' having outdoor and residential boxes and metal boxes storage and the other side 600d" having conduits and miscellaneous storage. FIG. 16 is shown with both sides 600e' and 600e" reserved for future storage space.

FIG. 17

Figure 17:
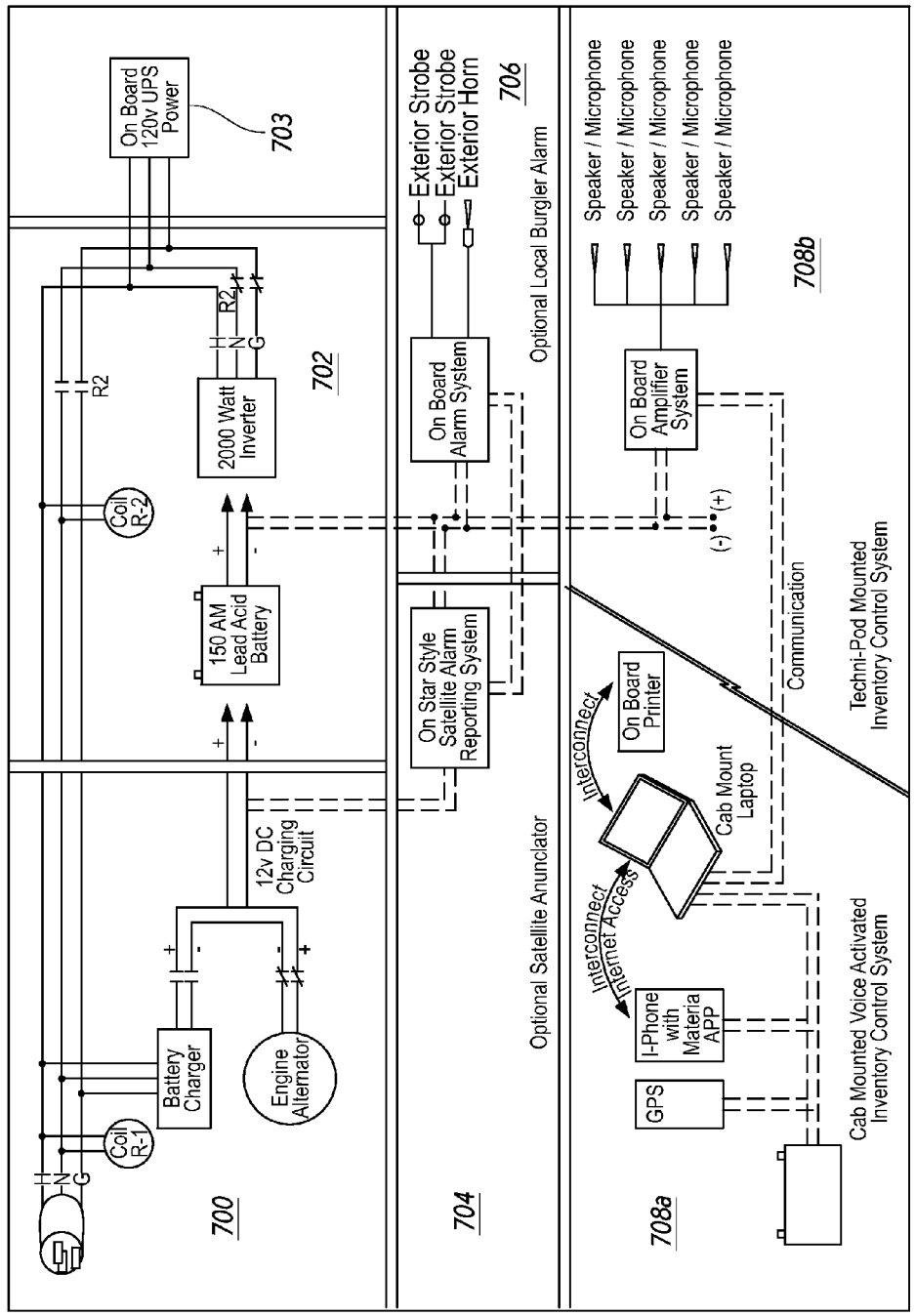
FIG. 17 is a schematic diagram showing five integrated sections including charging and bypass systems, an on-board 200 amp-hour battery with inverter, an ONSTAR®-type satellite system, a "car alarm"-type system, and a cab-mounted lap top interfaced with pod-mounted speakers to allow "voice communication" between the technician and the laptop.

The pod 100 has the usual locks and handles to provide normal security when unattended. Another innovative aspect of the pod 100, however, is its on-board electrical and electronic battery charging system, its security alarm system, its available ONSTAR® system, and its voice controlled computer that allows for material usage to be completely automated and Itemized. FIG. 17 is divided into sections separated by double lines, although all the sections are electrically integrated.

Section 700 shows the charging and bypass systems. The on-board equipment (section 702) may be recharged from the truck's alternator or the system may be plugged into an available 120 volt supply 703. When plugged in, the system bypasses battery power and operates directly from a house power source Section 702 shows an on-board 200 amp-hour battery with inverter. Even when unplugged from a 120 volt source or when the pod 100 is off the truck or the engine is not running, this onboard power source keeps security and 120 volt power available for the technician.

Section 704 shows that an ONSTAR®-type satellite system is an available option.

Section 706 indicates that a "car alarm"-type system is available with strobe and horn annunciation.

Section 708a and 708b indicate a cab-mounted laptop interfaced with pod-mounted speakers to allow "voice communication" between the technician and the laptop. This may allow on-board inventory control, computer controlled material orders, billing, and mileage and labor summaries to be instantly on-site.

FIGS. 18-20

The basic components of the electrical technician's duties include installing conduit, pulling wire, and terminating. The most often used wire sizes are numbers 14, 12 and 10. These conductors usually come in cable assemblies or individual conductors on spools.

The "de-spooler" 720 shown in FIG. 18 is simple in form, but effective in use. It comes in two sizes, 7 inch by 36 inch by 6½ inch and 9½ inch by 36 inch by 6½ inch. One size de-spooler accommodates spools with wire size number 18 through number 12. The other size de-spooler (slightly wider) accommodates number 18 through number 10 wire sizes. FIG. 19 shows a front driver's side pod section having a #12 wire roll de-spooler 724a, a #10 wire roll de-spooler 724b, and an extra roll storing drawer 724c.

Each de-spooler 720 has a place for five spools. This represents a traditional three phase group plus neutral and ground wire. Wire can be taken off the de-spooler 720 while it remains in its place on the pod 100. A simple elastic band near the de-spooler 720 handle affords the technician a secure place to place the cut ends of the spool so they are always available in the future.

FIG. 19 is an example of the construction of the "roll" wire section (spooled or roll wire subsection 402) of the pod 100. Note that there is a designated spot for storing each size de-spooler. Not shown on any of the illustrations is the fact that each de-spooler 720 comes with clips on the underside. When slid into place, the de-spooler 720 rests on the plywood shelf and its "clip" rides under that plywood. This is an important feature. In the following figures one will see that the pod 100 carries a "break-down" material cart. This clip assembly allows the de-spooler to be hung on this cart for transport.

The angled slots 722 that hold the spool axles allow wire to be pulled from the de-spooler 720 when lying flat or when suspended by the clips on the cart.

The notch 732 shown on the axle 730 (FIG. 20) keeps the axle 730 stationary while the reel turns. This keeps the rotating action of de-spooling wire from causing the axle 730 to "crawl" out of the slots 722 in the de-spooler 720. These notches 722 also prevent the axle 730 from sliding sideways without the traditional cotter pin or lynch pin that become easily lost or misplaced.

Axles 730, made from ½ inch EMT, are sturdy and easily replaced at the shop or on site.

FIGS. 21-24

As stated regarding FIGS. 18-20, the most common sizes of wire come on spools or in a cable assembly. Clearly the cable de-spooler 750 (shown in FIGS. 21-24) is made for the latter.

This cable de-spooler 750 consists of three basic pieces: the top section 760, the middle section 770, and the bottom section 780 utilizing a turntable bearing 790.

The top section 760 is held to the middle section 770 with VELCRO® 762, 772. Two pins extending from the middle section 770 align with two holes in the top section 760 forming a uniform fit.

FIGS. 21-24 show a cable de-spooler 750 having dimensions of 10½ inches by 16½ inches by 8¼ inches.

The middle (center or control) section 770 consists of four reinforced sides 774 (shown as reinforced with construction supports in FIGS. 21 and 24) that support a cylinder 776 (aluminum, steel, or fiberglass internal retaining wall) with an outlet opening (de-spooling port 778) through which the cable is removed from its factory coil. The cylinder 776 is large enough to handle all standard factory coils of 14, 12, and 10 gage cables with wire lengths held in the coil of up to 250 feet. FIG. 21 also shows the turntable 780 and the spindle 781. When the cable de-spooler 750 is in its storage location in the pod 100, cable can be removed without having to remove the de-spooler 750.

The bottom section 780 consists of a base plate 782 with holes that align with pins in the middle section 770. As shown in FIG. 22, a turntable bearing 790 is attached to the base plate 780, and a turntable disk 784 is attached to the bearing 790. This bearing 790 allows the cable coil to rotate within the cylinder 776 to release cable that has its coiled properties removed. FIG. 22 also shows a 6 inch spindle attached to the turntable 784 and bearing 790 assembly. FIGS. 22 and 23 show the relationship between the spindle top support 761 of the top section 760 and the top of the spindle 781. FIG. 23 shows the spindle top support 761 as a top mounted torque restriction. As shown in FIG. 23, the spindle top support 761 has a centering taper top and the top of the spindle 781 is a centering taper spindle. If one simply places a cable coil on the floor and starts pulling out cable, the cable comes out looking like a spring. Using the de-spooler 750, cable comes off in a smooth straight line making it much easier and faster to install in walls and ceilings.

The base section 780 offers one additional advantage when it is used as a stand-alone product. On larger projects cable is often ordered on 2,500 foot spools. By placing just the base unit 780 on the floor and tipping the reel on its end and resting on the turntable 784, cable is easily de-spooled from much larger reels with the same equipment. However, using this de-spooler 750 in this manner has a small draw back. There comes a point in time where so much cable has been removed from the reel that the force of its weight is no longer enough to hold the reel on the de-spooler 750. This happens when the force of pull in a lateral direction is larger than the force of the reel's weight through gravity.

FIGS. 25-27

The pod 100 is equipped with a break-down cart 800 (as shown in FIGS. 25-27) that can be easily assembled (in one or so minutes) for use in transporting tools and materials into or onto a worksite. When done with work for the job or the day, the cart 800 can be quickly disassembled and stored out of the way until needed in the future.

Every technician wishes he had one of these carts 800. However, to carry a full sized permanently assembled cart in a traditional van only creates havoc. This is because, when not in use, it is always in the way of accessing stored tools and materials.

Cart 800 is shown as being 24 inches wide and 34 inches tall (including the wheels). This cart 800 has small boxes built in for materials. The "roll de-spooler" can be hung from either end. VELCRO® straps are provided to secure conduit to the top of the cart 800 during transport or cutting. The cable de-spooler fits easily on the bottom shelf and there is plenty of room remaining on the cart 800 for cords, power tools, and personal hand tools.

The main pieces of the cart 800 are the top tray 810 (shown with VELCRO® straps 812 and built in bins 814), four legs 820, the bottom tray 830 (shown with wheel holders 832 and built in bins 834), and four quick attach/detach wheels 840. Thumb screws are shown for locking the legs 820.

When finished with a job, the cart is loaded and everything rolled back to the pod 100 in (hopefully) one trip.

When breaking the cart back down it is always self cleaning . . . but make sure any debris isn't left in the parking lot.

Options for the cart include a removable small pipe vise and a strong flexible and removable garbage basket

FIGS. 28-34

The described pod 100 provides an easily accessible storage system (ladder rack 900) for service ladders. Conventional vans with ladder racks place ladders over seven feet above the ground. Many include very expensive and complicated systems that will load and unload a ladder easily on a van. However, one seldom sees these in use because they are cumbersome, unreliable, require maintenance, and/or are expensive.

FIG. 28 shows a ladder rack 900 (also shown as 106 in FIG. 1). The ladder rack 900 includes a main portion 902 (part of which is shown in detail in FIG. 29) and two sub-portions 904, 906 (one of which is shown in FIG. 30). FIG. 29 shows the main portion 902 with two adjustable arms 910. The arms 910 are shown as adjustable to allow two ladders. Also shown with the main portion 902 is a rotation pin 912, a lock down pin 914, and a hole 916 for a locking clip. The sub-portions 904, 906 include a closure pin 920 and a lock position entry exit port 922.

FIGS. 31 to 34 show various positions of the ladder rack 900. FIG. 31 shows the ladder rack including a main portion 902 and two sub-portions 904, 906 in a traveling position. FIG. 32 shows the ladder rack 900 in which the main portion 902 has been slid back relative to the two sub-portions 904, 906 and lifted. FIG. 33 shows the ladder rack 900 in which the main portion 902 has been slid out and rotated down relative to the two sub-portions 904, 906. FIG. 34 shows the ladder rack 900 in which the main portion 902 has been rotated relative to the two sub-portions 904, 906. The main portion 902 may be rotated to 90 degrees relative to the two sub-portions 904, 906.

The shape of the pod 100 puts the outside top edges much closer to the ground at 6 foot, 4 inch to 6 foot, 5 inch. Then the innovative ladder rack 900 allows the ladders to be quickly and easily lowered to the side of the pod 100. In this position, the ladders rest on two adjustable (to allow up to two ladders) arms 910. While supported on the arms 910, the ladders are on their sides—right in front of you with the bottom of the ladders at about 4 foot, 5 inches above the ground. Permanently installed approved ladder tie downs or restraints 930 are removed and the ladder is easily lifted from the ladder rack 900. The ladder rack 900 is simply pushed back into storage position, and you are done.

There is no more slipping off wet bumpers or hanging out of doors in order to store or retrieve ladders. With the ladder rack 900, the ladders are always legally tied down so you don't get tickets from law enforcement.

One of the main premises in the design of the pod 100 is that eliminating frustration and the unnecessary expenditure of energy form the daily activity of the technician will lead to greater productivity. In turn, this leads to a competitive advantage for the company with the foresight to use the pod 100.

What is claimed is:

1. A modular vehicle-mountable pod for mounting in a vehicle having a front, a back, and two sides, said pod comprising:
   (a) an upper section, a center section, and a lower section, said upper section above said center section, and said center section above said lower section;
   (b) said center section having at least one door on each side of said vehicle; and
   (c) at least one sliding storage board within and in sliding relationship to said center section, each sliding storage board being a mounting surface board with at least one bin thereon, said at least one sliding storage board having a top edge and an opposite bottom edge, said at least one sliding storage board vertically mounted such that said top edge is above said bottom edge;
   (d) wherein said at least one sliding storage board is at least partially slideable through said at least one door on both sides of said vehicle such that said at least one bin is accessible.

2. The pod of claim 1 wherein said pod has a maximum height of 6 feet, 10 inches when it is unloaded.

3. The pod of claim 1, said upper section further comprising a plurality of elongated compartments parallel to the sides of said vehicle.

4. The pod of claim 1, said upper section further comprising a ladder storage system, said ladder storage system comprising:
   (a) a main portion with at least one arm for securing a ladder; and
   (b) at least one sub-portion;
   (c) wherein said ladder storage system has a traveling position in which said main portion is substantially overlapping with said at least one sub-portion, and at least one position in which said main portion is at an angle to said at least one sub-portion to allow access to said ladder.

5. The pod of claim 1, said center section being divided into subsections, said at least one sliding storage board within at least one of said subsections.

6. The pod of claim 1, said center section being divided into subsections selected from the group of subsections consisting of:
(a) a spooled or roll wire subsection;
(b) a cable subsection;
(c) an electrical subsection;
(d) a storage board subsection;
(e) a miscellaneous storage subsection; and
(f) an electrical tools, chargers, and test equipment subsection.

7. The pod of claim 1, said lower section including a rolling bed.

8. The pod of claim 1, said lower section including a plurality of sections selected from the group of sections consisting of:
(a) a personal tools section;
(b) a rolling bed section;
(c) a storage drawers section; and
(d) a jack storage section.

9. The pod of claim 1 further comprising at least one feature selected from the group of features consisting of:
(a) a 120 volt electrical system;
(b) a material storage area;
(c) an on-board computer;
(d) on-board security;
(e) a wire de-spooler;
(f) a de-spooler for cable; and
(g) a break-down rolling cart.

10. The pod of claim 1, said pod being easily removable from said vehicle.

11. The pod of claim 1 wherein said at least one sliding storage board has two accessible sides and a peripheral edge, one edge of said peripheral edge being said top edge and one edge of said peripheral edge being said opposite bottom edge, and said at least one sliding storage board vertically mounted such that said top edge is above said bottom edge.

12. The pod of claim 1 wherein a top bin mounted on said mounting surface is above a bottom bin mounted on said mounting surface.

13. A modular vehicle-mountable pod for mounting in a vehicle having a front, a back, and two sides, said pod comprising:
(a) an upper section, a center section, and a lower section, said upper section above said center section, and said center section above said lower section;
(b) said center section having at least one door on each side of said vehicle; and
(c) at least one sliding storage board within and in sliding relationship to said center section, each sliding storage board being a mounting surface board with at least one bin thereon, said at least one sliding storage board having two accessible sides, both accessible sides having at least one bin thereon;
(d) wherein said at least one sliding storage board is at least partially slideable through said at least one door on both sides of said vehicle such that said at least one bin is accessible.

14. The pod of claim 13 comprising:
(a) said at least one sliding storage board being a plurality of sliding storage boards within and in sliding relationship to said center section, each sliding storage board being a mounting surface board, at least one sliding storage board having a plurality of bins thereon;
(b) wherein each sliding storage board is at least partially slideable through said at least one door on each side of said vehicle such that at least one bin of said plurality of bins is accessible.

15. The pod of claim 13, said upper section further comprising a ladder storage system, said ladder storage system comprising:
(a) a main portion with at least one arm for securing a ladder; and
(b) at least one sub-portion;
(c) wherein said ladder storage system has a traveling position in which said main portion is substantially overlapping with said at least one sub-portion, and at least one position in which said main portion is at an angle to said at least one sub-portion to allow access to said ladder.

16. The pod of claim 14, said center section being divided into subsections, said plurality of sliding storage boards within at least one of said subsections.

17. The pod of claim 14 wherein each of said plurality of sliding storage boards has two accessible sides and a peripheral edge, said peripheral edge having a top edge and an opposite bottom edge, and each of said plurality of sliding storage boards vertically mounted in parallel to each other such that each top edge is above its respective bottom edge.

18. The pod of claim 14, each of said plurality of sliding storage boards having two accessible sides, both accessible sides having a plurality of bins thereon.

19. The pod of claim 14 wherein each of said plurality of sliding storage boards has a top edge and an opposite bottom edge, each of said plurality of sliding storage boards vertically mounted in parallel to each other such that said top edge is above said bottom edge, a top bin mounted on said mounting surface above a bottom bin mounted on said mounting surface.

20. A modular vehicle-mountable pod for mounting in a vehicle having a front, a back, and two sides, said pod comprising:
(a) a storage board section mountable on the vehicle, said storage board section having at least one door on each side of the vehicle;
(b) a plurality of sliding storage boards within and in sliding relationship to said storage board section, said plurality of sliding storage boards vertically mounted in parallel to each other; and
(c) each of said plurality of sliding storage boards having two accessible sides, both accessible sides having structure for mounting a plurality of bins thereon such that said bins are in a stacked relationship;
(d) wherein each sliding storage board is at least partially slideable through said at least one door on each side of the vehicle.

* * * * *